United States Patent [19]

Alesbury

[11] Patent Number: 4,960,837

[45] Date of Patent: Oct. 2, 1990

[54] POLYETHERIMIDES

[75] Inventor: Colin K. Alesbury, Hampshire, England

[73] Assignee: Pirelli General plc, London, United Kingdom

[21] Appl. No.: 249,858

[22] Filed: Sep. 27, 1988

[30] Foreign Application Priority Data

Oct. 1, 1987 [GB] United Kingdom ................. 8723048

[51] Int. Cl.[5] ...................... C08F 283/04; C08G 8/02
[52] U.S. Cl. .................................... 525/420; 525/474; 528/125
[58] Field of Search ................. 525/420, 474; 528/125

[56] References Cited

U.S. PATENT DOCUMENTS 3,905,942  9/1975  Takekoshi et al. ................. 528/353
3,991,004  11/1976 Takekoshi et al. ................. 528/353
4,443,591  4/1984  Schmidt et al. ..................... 528/128

Primary Examiner—John Kight, III
Assistant Examiner—P. Hampton-Hightower
Attorney, Agent, or Firm—Brooks Haidt Haffner & DeLahunty

[57] ABSTRACT

Graft polymers are produced by grafting amine or acyl groups onto the imide groups of silicone polyimides or polyetherimides; the graft polymers can be moulded onto wires and cross-linked by electron beam irradiation to form insulation having improved properties.

9 Claims, No Drawings

POLYETHERIMIDES

This invention relates to polyetherimides and particularly to the grafting of sidechains onto polyetherimides to render them more readily crosslinkable.

Although not initially developed as wire insulation materials, polyetherimides have already found wide application in that field due to their intrinsic flame retardant characteristics and mechanical strength. However, polyetherimides are not entirely satisfactory in terms of flexibility and environmental stress craze resistance, for example resistance to chlorinated solvents and aviation fuel.

It is believed that polyetherimide-based materials will exhibit even better properties than hitherto if they can be crosslinked, and the present invention seeks to provide improved polyetherimide-based materials which can be more readily crosslinked than conventional polyetherimides.

The materials according to the invention are graft polymers produced by grafting amines onto the imide groups of polyimides, especially silicone polyimides and polyetherimides, and these materials contain reactive sites for subsequent cross-linking.

The graft polymers are preferably produced by reacting a polyetherimide of the general formula

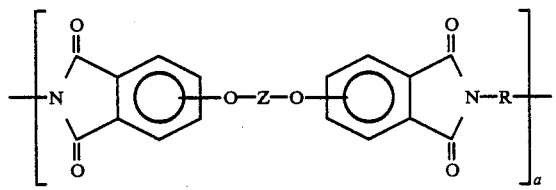

in which $a$ has a value of at least 100 and preferably at least 500, R may be

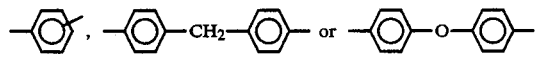

Z may be

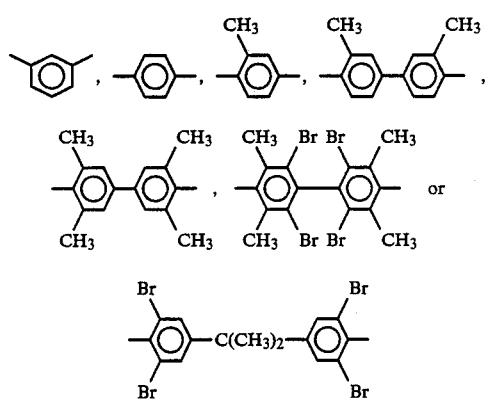

or a group of the formula

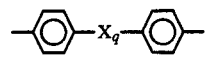

in which X is $C_yH_{2y}$, 

$q$ is 0 or 1 and $y$ is an integer from 1 to 5, and the divalent bonds of the —O—Z—O— group are in the 3,3'; 3,4'; 4,3' or the 4,4' positions, with an amine of the formula

R'—NH—R"

in which R' is an alkyl, alkenyl, alkoxyalkyl, ketyl, ketenyl, fluoroalkyl or fluoroalkenyl group having at least 4 and preferably from 8 to 18 carbon atoms, or is a phenyl or substituted phenyl group (for example, phenyl substituted by fluoro or even amino), and R" is hydrogen or together with R' and the nitrogen forms an alicyclic group, to form within the polyetherimide units of the formula

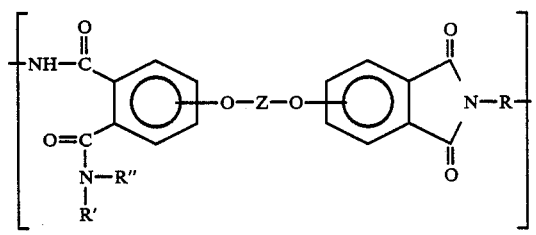

Of the amines of the above formula, there are preferred long chain primary amine and fluorinated amines (for example heptafluorobutylamine and pentafluoroaniline).

The reaction is suitably carried out at an elevated temperature and under atmospheric or slightly elevated pressure, for example in a screw mixer at a temperature from 300° to 400° C., especially at about 310° C.

Alternatively, the polyetherimide may be reacted with an acyl or fluoroacyl halide of the formula

R'''—CO—X'

(for example perfluorobutanoyl chloride) to form within the polyetherimide units of the formula

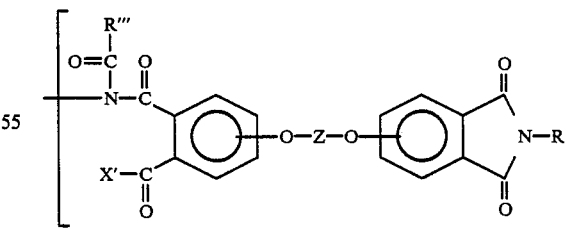

By grafting on the amine (for example octadecylamine) or acyl group, reactive sites are provided for subsequent electron beam crosslinking. Crosslinking between side chains can be achieved (as is the case with polyethylenes) after the addition of a sensitiser, for example triallyl isocyanurate (TAIC) and N,N-metaphenylene dimaleimide (such as that available as HVA-2 from DuPont), by electron beam irradiation.

In order to illustrate the invention, three amines were grafted onto ULTEM 1000 polyetherimide (from General Electric Company) which has the formula

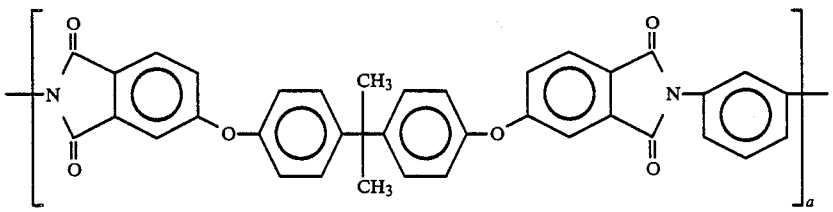

Grafting was followed using Differential Scanning Calorimetry (DSC) by monitoring the reduction in glass transition temperature (Tg) of the polymer. Tg results for graft copolymers based on the three amines are shown below. Reactions were carried out in a twin screw mixer at 310° C. and at an imide:amine group ratio of 10:1.

| AMINE | Tg (°C.) |
|---|---|
| (ULTEM 1000 | 213) |
| octylamine | 168 |
| octadecylamine | 164 |
| 4,4'-methylenedianiline | 190 |

These reductions in glass transition temperatures have the advantage that further compounding stages in the processing of these graft polymers may be carried out at significantly reduced temperatures (compared to the temperature of 310° C. required for pure ULTEM 1000).

A range of graft polymers, based on ULTEM 1000 and octadecylamine, has also been produced and the reduction in Tg again monitored by DSC. The results obtained are as follows:

| IMIDE: AMINE RATIO | Tg (°C.) |
|---|---|
| (ULTEM 1000 | 213) |
| 100:1 | 208 |
| 40:1 | 196 |
| 20:1 | 164 |
| 10:1 | 158 |
| 1:1 | 150 |

A plot of imide:amine group ratio against Tg indicates that the optimum reaction ratio is about 20:1.

The grafted product may be compounded with conventional additives, for example fillers, reinforcing agents, flame retardants, stabilizers, plasticizers, dyes and pigments in conventional amounts and with a suitable sensitizer (for example TAIC) in an amount from 5 to 20% based on the weight of the polyetherimide and, after being moulded into its final form, for example applied as wire insulation either directly to the wire or as an outer layer of a dual layer wire insulation, subjected to electron beam irradiation. Radiation doses of 10 to 40 MRad may be used.

I claim:

1. A graft polymer produced by grafting an amine or an acyl group onto the imide groups of a silicone polyimide or a polyetherimide.

2. A graft polymer according to claim 1 produced by reacting a polyetherimide of the general formula

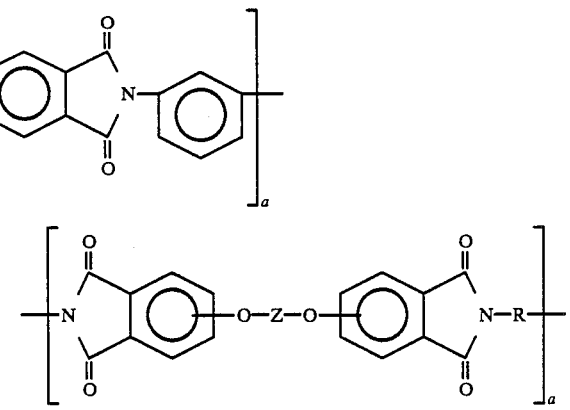

in which a has a value of at least 100 and preferably at least 500, R may be

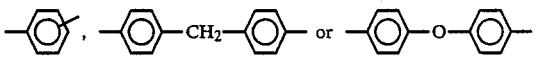

Z may be

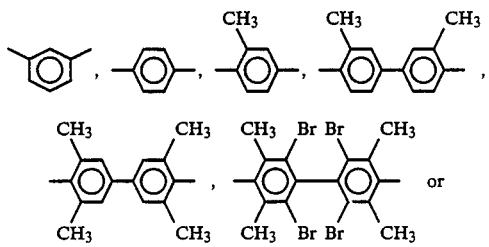

or a group of the formula

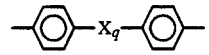

in which X is $C_yH_{2y}$, $-\underset{\underset{O}{\|}}{\overset{\overset{O}{\|}}{C}}-$, $-\underset{\underset{O}{\|}}{\overset{\overset{O}{\|}}{S}}-$, $-O-$ or $-S-$, q is 0 or 1 and y is an integer from 1 to 5, and the divalent bonds of the —O—Z—O— group are in the 3,3', 3,4', 4,3' or 4,4' positions, with an amine of the formula

R'—NH—R"

in which R' is an alkyl, alkenyl, alkoxyalkyl, ketyl, ketenyl, fluoroalkyl or fluoralkenyl group having at least 4 and preferably 8 to 18 carbon atoms, or is a phenyl or substituted phenyl group, and R" is hydrogen or together with R' and the nitrogen forms an alicyclic group, to form within the polyetherimide, units of the formula

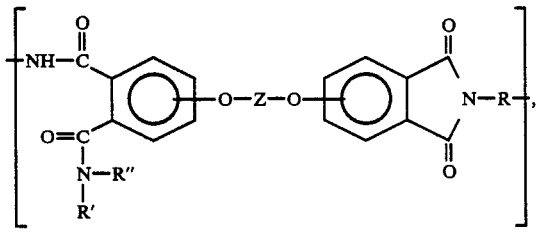

or with an acyl or fluoroacyl halide of the formula

R'''—CO—X' in which R''' is an alkyl or fluoroalkyl group and X' is a halogen to form within the polyetherimide, units of the formula

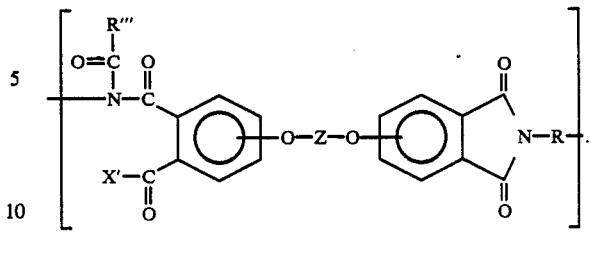

3. A graft polymer according to claim 2, wherein the amine is a long chain primary amine or a fluorinated amine.

4. A process for producing a graft polymer according to any one of claims 1, 2 or 3, which comprises reacting a polyetherimide as specified in claim 2 with an amine as specified in claim 2 or claim 3 at an elevated temperature under atmospheric or slightly elevated pressure.

5. A process according to claim 4 carried out at a temperature form 300° to 400° C. in a screw mixer.

6. A moulded article comprising a graft polymer according to any one of claims 1, 2 or 3 which has been crosslinked.

7. A moulded article according to claim 6, in the form of a wire insulation.

8. A process for producing a moulded article according to claim 5, wherein the graft polymer according to any one of claims 1, 2 or 3, in admixture with a sensitiser, is applied to an electrical conductor either directly or as the outer layer of a dual layer insulation, and subjected to electron beam irradiation to effect crosslinking.

9. A process according to claim 8 wherein the radiation dose is from 10 to 40 MRad.

* * * * *